United States Patent
Browne et al.

(10) Patent No.: US 9,267,493 B2
(45) Date of Patent: Feb. 23, 2016

(54) INTRINSIC MONITORING OF SHAPE MEMORY ALLOY ACTUATED DEVICES

(71) Applicant: GM Global Technology Operations LLC, Detroit, MI (US)

(72) Inventors: Alan L. Browne, Grosse Pointe, MI (US); Paul W. Alexander, Ypsilanti, MI (US); Nancy L. Johnson, Northville, MI (US); Xiujie Gao, Troy, MI (US); Nilesh D. Mankame, Ann Arbor, MI (US); Guillermo A. Herrera, Winnetka, CA (US); Geoffrey P. McKnight, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 523 days.

(21) Appl. No.: 13/648,307

(22) Filed: Oct. 10, 2012

(65) Prior Publication Data

US 2014/0096516 A1   Apr. 10, 2014

(51) Int. Cl.
*F03G 7/06* (2006.01)

(52) U.S. Cl.
CPC ........................................ *F03G 7/06* (2013.01)

(58) Field of Classification Search
CPC ............ F03G 7/06; F03G 6/06; F01B 29/10; F02G 1/04; F01K 7/06
See application file for complete search history.

(56) References Cited

U.S. PATENT DOCUMENTS

| | | | | |
|---|---|---|---|---|
| 4,551,975 A * | 11/1985 | Yamamoto | ......... | H01H 61/0107 60/528 |
| 6,574,958 B1 * | 6/2003 | MacGregor | ....................... | 60/527 |
| 7,607,717 B2 | 10/2009 | Browne et al. | | |
| 7,637,105 B2 * | 12/2009 | Sizer | ................... | B60C 23/0408 60/528 |
| 7,686,382 B2 | 3/2010 | Rober et al. | | |
| 7,886,535 B2 * | 2/2011 | Matsuki | ................... | F03G 7/065 60/527 |
| 8,188,757 B2 | 5/2012 | Herrera et al. | | |
| 2004/0261411 A1 * | 12/2004 | MacGregor | ............. | F03G 7/065 60/527 |
| 2006/0162332 A1 * | 7/2006 | Klaffenbach | ........... | F03G 7/065 60/527 |
| 2009/0009656 A1 * | 1/2009 | Honda | ..................... | G03B 3/10 348/372 |
| 2009/0133398 A1 * | 5/2009 | Hamaguchi | ............. | F03G 7/065 60/527 |
| 2010/0236236 A1 * | 9/2010 | Mankame | ............... | F03G 7/065 60/527 |
| 2010/0326070 A1 * | 12/2010 | Hao | .................... | H01H 61/0107 60/527 |
| 2011/0088387 A1 * | 4/2011 | Von Behrens | ........... | F03G 7/065 60/527 |
| 2011/0154817 A1 * | 6/2011 | Zimmer | ............. | A47B 88/0477 60/528 |
| 2012/0109573 A1 | 5/2012 | Gao et al. | | |
| 2012/0174573 A1 | 7/2012 | Skurkis et al. | | |
| 2012/0184195 A1 * | 7/2012 | Browne et al. | ................... | 454/75 |

\* cited by examiner

*Primary Examiner* — Thomas Denion
*Assistant Examiner* — Shafiq Mian
(74) *Attorney, Agent, or Firm* — Reising Ethington P.C.

(57) ABSTRACT

Some on-vehicle devices, such as air dams, air spoilers, and HVAC system baffles, may have movable components that are pulled from one position to another by shrinkage of a linear shape memory alloy (SMA) actuator. Upon an activation signal, the shrinkage of the SMA actuator occurs when it is resistance heated by an electrical current. It is found that useful information concerning the overall intended operation of the on-vehicle device may be obtained by computer analysis of the temporal variation of both current flow through the actuator and its electrical resistance as it is heated to perform its function in the device. A comparison of present current flow and variation of resistance, during activation of the device, with prescribed stored values can reveal malfunction of components of the device as it is being used, in place, on the vehicle.

24 Claims, 1 Drawing Sheet

US 9,267,493 B2

INTRINSIC MONITORING OF SHAPE MEMORY ALLOY ACTUATED DEVICES

TECHNICAL FIELD

This invention pertains to the use of periodic monitoring of the performance of a linear, shape memory alloy, mechanical actuator for a movable element of an on-vehicle device as a means of identifying problems that may arise in the operation of the device during its life on the vehicle. More specifically, this invention pertains to the measurement and analysis of values (including computer-stored values) of the electric current flow and the electrical resistance of the linear shape memory alloy actuator, as it is being heated and activated, in identifying a variety of potential problems with the overall function of the device. Then, an operator of the vehicle may be notified of the existence (or potential existence) of a problem in the operation of the device.

BACKGROUND OF THE INVENTION

Linear mechanical actuators of shape memory alloy (SMA) compositions have been used in a variety of devices, many of which have been conceived for use on automotive vehicles. For example, U.S. Pat. Nos. 7,607,717, 7,686,382, and 8,188,757, and Patent Application Publications 2012/0174573 and 2012/0184195, each assigned to the assignee of this invention, describe and illustrate a number of on-vehicle devices using linear mechanical actuators formed of shape memory alloys such as nickel-titanium based alloys. The portions of these patent disclosures pertaining to compositions, shapes, and functions of shape memory alloy, mechanical actuators for devices are incorporated herein by reference. These documents describe and illustrate that movable air flow dams, air flow spoilers, and baffle controllers within Heating Ventilation Air Conditioning outlet housings are examples of on-vehicle devices that may be set in motion by linear SMA actuators.

Often the SMA actuator is in the shape of a wire (or band, strip, cable, or other generally linear shape) and a change in the length of the actuator is used to move or otherwise activate a movable member or element of the device. The change in length of the actuator is typically achieved by exploiting the metallurgical and mechanical properties of a selected alloy composition. A desired remembered-length characteristic is formed in the linear actuator at a suitable elevated temperature at which the metallurgical alloy composition is in its austenitic phase. In the next manufacturing step the intended linear actuator is cooled to a lower temperature region at which it transforms to it martensite phase. This lower temperature region is preferably the ambient temperature region in which the device is to be operated. When the linear actuator material is in its martensite phase it displays an approximately 2.5 times decrease in stiffness, and it is stretched (sometimes termed "pseudo plastically deformed") to a longer length. The longer length of the linear actuator material is utilized as its "ready" actuator length. Then, upon a need for an activation function, the actuator is heated to re-transform it to its austenite phase. With such heating and metallurgical phase transformation, the wire experiences an approximately 2.5 times increase in stiffness, undergoes change in its electrical resistance, and it shrinks to its remembered length and, thereby, moves and repositions the movable part of the device in which it is placed.

Thus, in many uses, the metal alloy composition of the wire actuator is prepared so that the wire has a predetermined length at an ambient temperature for the use of the device. This initial length of the actuator is placed in the device and retains that length until an element of the device is to be moved or otherwise actuated. Upon a suitable signal for actuation of the device, the wire is then heated, such as by electrical resistance heating. As the wire is heated it shrinks in length (e.g., five to eight percent of its ambient temperature length) to move some part of the device. The heating and phase transformation is typically accomplished in a relatively short period of seconds or minutes depending on the ambient temperature, the size of the linear actuator, and the current flow. But some heating of the actuator is continued while the device is in its actuated condition so that the actuator is maintained in the shortened, remembered length of its austenitic phase. When de-activation of the device is signaled, heating is stopped and the actuator is cooled back to its martensite phase, often by heat transfer to the ambient environment. As the SMA actuator is cooled, it softens and is stretched with a complementary, attached spring in its device, to strain the SMA wire to its intended length for the next actuation of the device in which it is employed. The movable component of the device is returned to its rest position as the SMA wire is being elongated. The moving component may be pulled against a stop in the device to assure that the SMA actuator is returned to its original length.

While the function of such linear SMA actuators is relatively simple, a typical actuator is usually expected to experience many repeated metallurgical phase transformations as well as repeated length-stretching deformations in order to serve its purpose in its air dam or other on-vehicle device. These repeated phase transformations and deformations of the actuator may result in unwanted changes in its ambient temperature length and its capacity to undergo full work-producing phase transformations. Further, there may be unwanted mechanical changes in the other elements of the device in which the actuator is employed. There is a need for low cost and relatively inexpensive diagnostic procedures to detect problems and deterioration in the performance in the operation of the SMA actuator and related problems arising in associated elements of the actuated device which affect the viability or "health" of the actuator and device. Often such SMA actuated devices may be employed in difficult-to-reach locations on automotive vehicles, and often there is a need to inform the operator of the vehicle of such problems.

SUMMARY OF THE INVENTION

In a representative device, one end of a linear SMA actuator is attached to a fixed surface of its device and the other end is attached to a device-member to be moved or actuated when the SMA actuator is heated and shortened. The linear SMA actuator may be employed in a straight motion path, but may be also be used in a curved, wound, or other shape in its motion path. A spring or other biasing (return) mechanism of suitable tension is also attached to the movable component to act in opposition to the SMA actuator and to return the movable component to its stored position. This action of the opposing spring physically re-stretches the cooled and weaker SMA actuator to its original rest-position length. In the on-demand operation of a linear SMA actuator element (as opposed to autonomous ambient temperature induced activation), electrical contacts are made to the ends of the actuator to enable a direct electrical current to pass through the full length of the shape memory composition metal alloy constituting the wire or other linear shape. Suitable electrical instrumentation and computer-based analytical devices are also provided to measure applied electrical potential and to measure and control the amount of current passed through the linear actuator as it is heated to transform its metallurgical structure from its ambient temperature-stable, relatively weaker, martensite phase into its higher temperature, higher strength austenite phase. This heating and phase transformation shorten the length of the actuator by the intended amount in moving a component of its device, for example, from a stored position to an active position.

In a typical vehicle application, and in other non-vehicle applications, the initial actuation of the device may often be commenced by operator initiative. But the control of the direct current used in heating the actuator is typically managed by a suitably programmed, on-vehicle computer. For example, an initial-stage current flow may be used for rapid heating of the linear martensite-phase actuator for prompt action of the intended device. This current flow may be required for a second or two to affect the phase transformation in the wire. Thereafter, a reduced current may be used during the activated state of the device to maintain a temperature required for the austenite phase structure of the actuator, compensating for heat loss to the cooler ambient environment in which the device is located.

In accordance with practices of this invention, values of the electrical resistance of the full length of the SMA actuator are also measured during predetermined stages of current flow (or attempted current flow) through the actuator. The values may be calculated from instantaneous values of applied DC voltage and measured current flow in amperes. For example, it is generally observed that the resistance of an SMA actuator increases as current flow is started and its temperature increases. The electrical resistance reaches a peak level near the start of transformation from martensite to austenite. During the transformation, which occurs over a temperature range, the electrical resistance generally decreases. Near the end of a complete phase transformation, the resistance reaches a minimum and then rises slowly when the actuator is in its fully austenitic state. Thereafter, the resistance of the austenitic phase actuator may decrease as the heating current is decreased to a value for maintaining the shortened length of the actuator, in its transformed microstructure, while the device is operated. Some of these patterns of resistance values over time may be selected and stored by operation of the managing computer for historical or base-line values for later comparison with later resistance-time values obtained during subsequent activations of the SMA actuator for device operation.

Again, in accordance with practices of this invention, these time-varying values of the current flow and electrical resistance of an SMA actuator may be used in many different ways to diagnose the operation of the actuator and of the device in which it functions. As will be seen, the current flow, the electric potential, and hence the electrical resistance values of the actuator may be used in combination with suitable computer-based analysis to identify malfunctioning of the actuator and/or the device, and to alert a vehicle operator that remedial action may be required. For example, open circuits associated with the SMA actuator are manifested as no current flowing through the actuator. Loose contacts associated with the actuator cause fluctuations in electrical potential (noise). And short circuit malfunctions in the device system are indicated by high current flow and low electrical potential, thus low resistance values. Insufficient heating or cooling of the actuator in its device may be identified. Blocked contraction or excessive lengthening of the actuator may be detected. Excessive or low stress levels in the actuator may be detected. In each example, a suitably programmed computer may use and compare electric current-time values and electric resistance-time values with initially specified values, value ranges, or historical values for an SMA linear actuator. When the system detects a departure from its normal values, it considers and recognizes a problem in the device, and notifies a vehicle operator, for example, of a device system problem and, often of a proposed solution or course of action to take (such as what physical aspects of the device and its environment to check or that the nature of the problem requires a visit to a repair facility).

In one embodiment of this diagnostic practice, the current flow through the SMA actuator is evaluated, such as during an actuation of the device. If no current flow is detected, there is likely an open circuit in the heating circuit for the actuator. Appropriate notice is provided to the vehicle operator (or to another suitable recipient) through the computer management system. If the measured current flow is seen to be above normal values, notice of a short circuit is provided through the computer management system. When the measured current flow is favorably compared with design values or experienced values, the diagnostic procedure may move to considerations of the electrical resistance measured during a normal actuation stage of the linear SMA element.

It is contemplated that a regularly used SMA actuated device will have a recent history of time-varying resistance values obtained during actuation and maintenance of the movable device element in its open or stored position. For example, the resistance values obtained during recent cycling of the SMA actuator may depend in part on the ambient temperatures experienced by the vehicle. In any event, comparison values of the electrical resistance of an SMA actuator may be used in the diagnostic method and these comparisons may be used in identifying problems arising during attempted operation of the device. When the current pattern of resistance-time values bears a satisfactory relationship to the recent history resistance-time pattern values or design resistance pattern values, it may be concluded that the SMA actuator and connected device components are functioning properly. But when there is a departure on the detected patterns of such resistance values, the diagnostic process is conducted to consider specific possibilities of problems in the operation of the device.

For example, values of unusually high peak resistance, detected as the linear SMA actuator is being heated and shrunk, may indicate blockage of the movable device component and high stress in the SMA actuator. Conversely, low resistance values may indicate an unattached SMA piece or broken elements in the device. And inconsistencies in patterns of actuator resistance during current flow can indicate incomplete stretching or incomplete contraction of the SMA actuator. Other inconsistencies in resistance vs. time values can indicate excessive cooling of the actuator. Many of these potential problems in the operation of a device relying on an SMA wire actuator may be detected, analyzed, and reported by use of current values and resistance values obtained during heating of the SMA actuator.

The results of the diagnostic procedures may be presented by the computer management system visually (or audibly) in the vehicle to the vehicle operator, and/or the results may transmitted by the computer management system to remote locations for further diagnosis and reporting, for example, to a smart phone or other computing device of the vehicle operator and/or of a service location for the vehicle and its SMA actuated device(s).

These and other objects and advantages of this invention will be understood from a detailed description of illustrative examples which follow in this specification.

DESCRIPTION OF PREFERRED EMBODIMENTS

Figure 1:
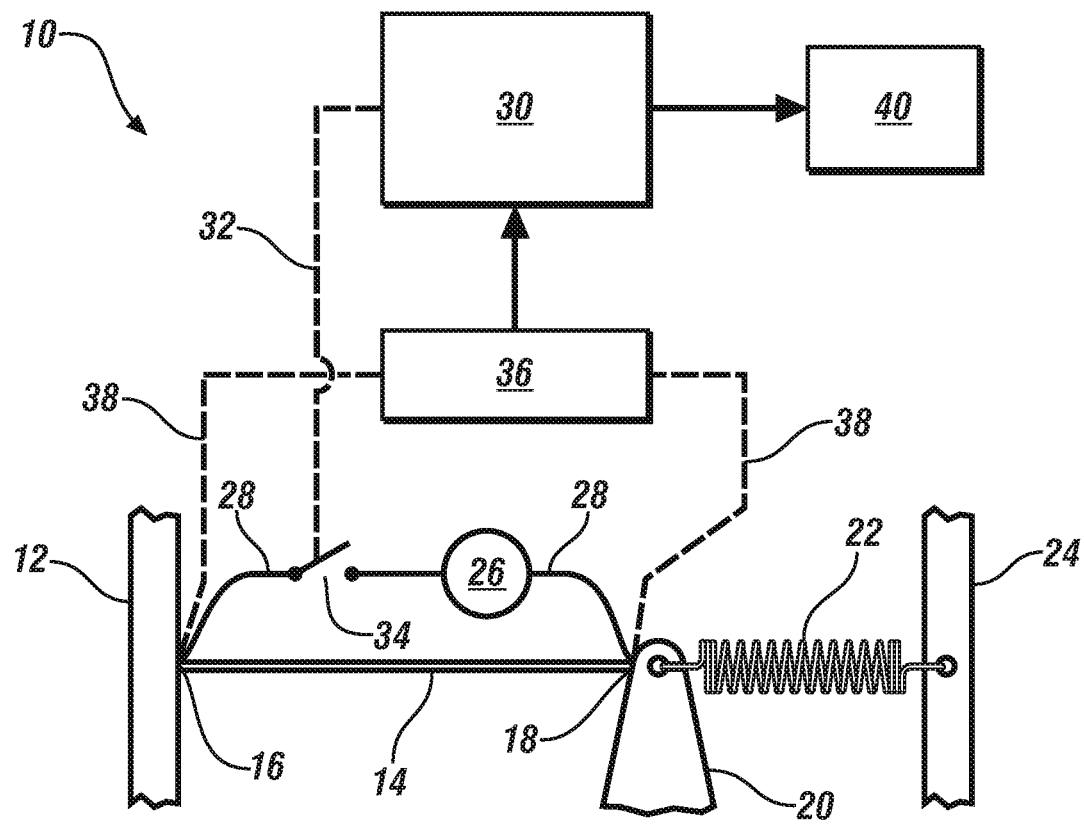
FIG. 1 is a fragmentary schematic illustration of an exemplary linear shape memory alloy actuator for movement of a movable component in a device for an automotive vehicle. One end of the shape memory alloy actuator is anchored to a structure of the device and the other end is connected to a movable lever arm in the device. The illustration includes a computer control system for management of the SMA actuator, a battery for electrical resistance heating of the actuator, and instruments for measuring the current flow and electrical resistance of the actuator during its activation. These instruments and computer management system are also used in diagnosing and giving notice of problems arising in the function of the on-vehicle device.

Shape memory alloys (SMAs) are alloys which undergo substantially reversible transformation between two crystal phases—a low temperature phase known as martensite and a high temperature phase known as austenite. The particular phase transformation temperature (or temperature range) varies with the alloy system, but generally ranges from between about −100° C. to about +150° C. or so. Shape memory behavior has been observed in a large number of alloy systems including Ni—Ti, Cu—Zn—Al, Cu—Al—Ni, Ti—Nb, Au—Cu—Zn, Cu—Zn—Sn, Cu—Zn—Si, Ag—Cd Cu—Sn, Cu—Zn—Ga, Ni—Al, Fe—Pt, Ti—Pd—Ni, Fe—Mn—Si, Au—Zd, and Cu—Zn, but only a few of these alloys are commercially available. Nitinol, an alloy of nickel and titanium in substantially equiatomic proportion, enjoys the widest use. Ni—Ti alloys, and others, may be prepared in the form of wires and other linear shapes suitable for use as actuators in on-vehicle devices. They may be prepared to display a relatively soft (low modulus) martensite phase at ambient vehicle temperatures of about 25° C. to 30° C., and lower, and to transform to their higher modulus austenite phase when heated twenty Celsius degrees or more above their ambient temperature phase. The transformation temperature range is chosen based the requirements of the application of the device.

Devices which employ linear shape memory alloy (SMA) actuators are generally robust and sustain repeated metallurgical phase transformations and repeated linear strain deformations for extended periods. These characteristics, and the simplicity of their linear shapes, make such SMA-actuators attractive candidates for use in devices on motor vehicles.

But, like all mechanical and electromechanical devices, even SMA actuated devices may malfunction in some part of their structure and it is desirable that any such malfunction be quickly detected so that prompt remedial action may be taken. In at least some vehicle applications of SMA devices, a device may not be readily accessible to the vehicle operator and so its performance may not be readily evaluated by inspection. Thus, there is interest in processes and procedures for remotely assessing the functionality of such devices, particularly those of automotive interest.

The actuation behavior of SMAs results from a metallurgical transformation. It is the solid-state transformation from one crystalline phase, martensite, to a second crystalline phase, austenite, which is exploited in most devices. The reverse transformation from austenite to martensite serves only to 'reset' the device and render it suitable for another martensite to austenite transformation. The sequence of transformations from martensite to austenite and from austenite back to martensite is considered a cycle.

These transformations are primarily responsive to temperature and so may be simply and reliably controlled by managing the SMA temperature. For the martensite to austenite transformation, which occurs at some temperature above ambient temperature, often at between 60° C. to 70° C. or so, this may be most conveniently done by passing an electric current through the length of the wire to raise its temperature by resistance heating. The reverse transformation, of austenite to martensite may often occur at, or slightly above, ambient temperature and may result from discontinuing resistance heating and relying on heat loss from the SMA to its on-vehicle surroundings to cool the wire. Also, the cooled martensitic phase actuator is strained to lengthen it to its designed length for a subsequent activation action. These metallurgical transformations and mechanical deformations are not completely reversible and the SMA element may undergo a modest increase in length after some cycles. But, with proper design, this irreversibility is very slight, and will not generally interfere with satisfactory device operation until the SMA element has experienced thousands to even millions of cycles of operation.

But even if the SMA element itself is performing satisfactorily, it is only one part of the overall device and there are other possible contributors to a malfunction. These may be electrical or mechanical, but many may be reliably detected or inferred from electrical measurements. As previously noted, electric resistance heating is a preferred method of heating the wire and promoting the martensite to austenite transformation, so measurements may be made as the device is actuated. Typically a device may be actuated only in response to operator input but, optionally, the following diagnostic procedures may be initiated at any time. For example it may be preferred to automatically exercise and diagnose the performance of SMA devices on engine start-up rather than risk learning of a malfunction while under way.

FIG. 1 presents a fragmentary and schematic illustration of a generalized device for use on an automotive vehicle and further provides a schematic illustration of a computer control system and associated instrumentation for practices of this invention. The on-vehicle device and control and instrumentation are identified generally by the numeral 10 in FIG. 1. As described above in this specification, examples of such on-vehicle devices are air dams, air flow spoilers, and air flow baffles in HVAC systems. In these devices, a movable member is repeatedly moved from a closed or stored or other inactive position to an active or open position during the life of the device and vehicle. And a linear SMA actuator and a complementary (opposing) spring (or rubber band or other tensioning device) may be used to move the movable member back and forth between its stored position and its active position. In a device like an air dam or air spoiler, the movable member may be moved to its operative position and maintained in that position throughout a vehicle trip. In other devices, like an air conditioner baffle, the member may be moved several times during a use of the vehicle. So, with at least three members of the device repeatedly acting together, there are opportunities for a malfunction in the device.

In general, such an on-vehicle device has a wall or structural member 12 (represented as a fragment of such a member in FIG. 1). One end 16 of a linear SMA actuator 14 is fixed to wall member 12. The other end 18 of linear SMA actuator 14 is attached to a movable member, such as lever arm 20 (a portion of which is illustrated in FIG. 1). Also connected to lever arm 20 is one end of spring 22. The other end of spring 22 is fixed to another supporting member 24 of the on-vehicle device. SMA actuator is illustrated in its ambient temperature (martensite phase) length in FIG. 1. Lever arm 20 is shown in its stored position in FIG. 1, and it may be maintained in that position by a post or other blocking member (not shown) against the force of spring 22. Spring 22 is specified to apply a tensile force to lever arm 20 and linear SMA actuator 14 that will not prevent actuator 14 from moving lever arm 20 as the SMA actuator is being heated to transform it into its austenite microstructure. That actuation motion is not to be prevented or impeded by spring 22. But spring 22 will exert sufficient force on lever arm 20 and actuator 14, when the actuator is being cooled to its martensite microstructure, to stretch and deform the less-stiff martensitic actuator back to its original length.

Battery 26 (or other current source) is provided to provide a suitable DC potential and current through conductor leads 28 to ends 16, 18 of linear SMA actuator 14 to heat the actuator to transform it into its austenite phase for movement of lever arm 20 when the device is to be activated. Depending upon the nature of the on-vehicle device, it may be activated by a vehicle operator or by a computer system. In either mode of device initiation, the flow of current from battery 26 will often be directed by a command from a suitable programmed computer system 30 by means of a signal connection 32 from computer system 30 to switch 34 in a battery lead 28. An instrumentation package 36, typically comprising at least a voltmeter, ammeter, and timing device, is connected, through suitable leads 38, to the ends 16, 18 of linear SMA actuator 14 to provide data comprising applied DC voltage, current flow (typically in amperes), and electrical resistance (ohms) to computer system 30. Computer system 30 acquires and stores such electrical current data and resistance data and compares it with corresponding pre-stored, specified data, and historic data, to monitor the operation of the on-vehicle device, especially as the device's operation affects (or is affected by) the operation of the linear SMA actuator 14. An illustration of such monitoring by computer system 30 is presented in the following paragraphs of this specification. But, when computer system 30, in its device monitoring mode of operation, detects some problem in the functioning of the device, a visible notice is provided to the vehicle operator on a vehicle instrument panel screen 40, or the like. Of course, an audible alert may be provided depending on the nature and significance of the problem arising in the device. Notification to a driver may also be affected indirectly through electronic communications such as through signals sent through remote systems, such as OnStar® (a subscription-based service including in-vehicle security, communications, navigation, and remote diagnostics), where the analysis of the computer system 30 signals and decisions as to appropriate action to be taken could be made in a central off-the-vehicle system and then transmitted back to the vehicle and to the vehicle's operator. Diagnostic information may also be sent to a device repair location.

Figure 2:
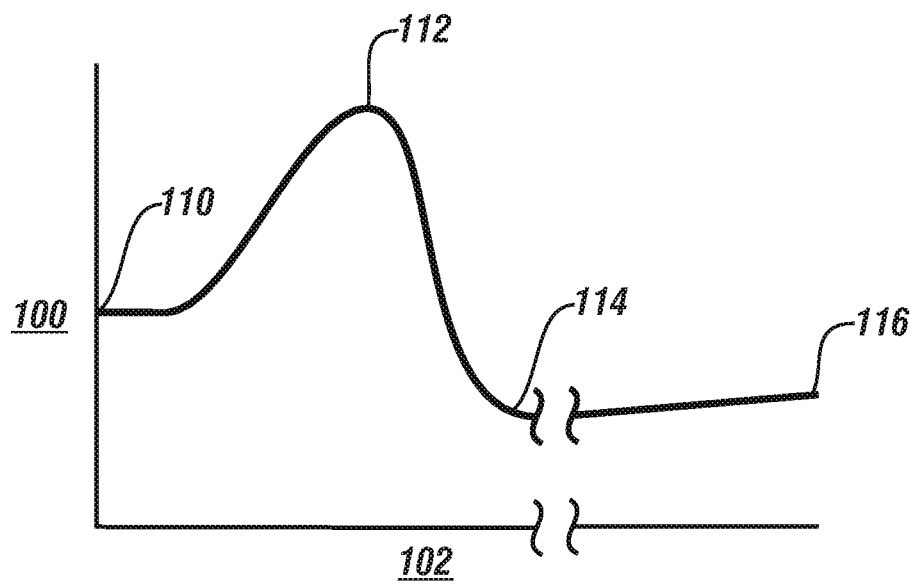
FIG. 2 is a graph of values of the electrical resistance (axis 100) of a representative linear shape memory alloy actuator during a time period (axis 102) as it is heated to change the metallurgical phase of the actuator, to shorten it, and reposition a movable element of the on-vehicle device. In a properly functioning device, a typical SMA actuator displays an initial resistance value 110 which increases to a maximum resistance value 112 through the start of its phase transformation. The time period that it takes to heat the actuator wire through to the start of its phase transition is dependent on factors such as the current level, wire diameter, and ambient temperature and the period can be from a few milliseconds up to minutes depending on such factors. As phase transformation is completed, the resistance drops to a minimum value 114 which is generally sustained throughout whatever period the actuator is turned on when the actuation current is reduced to maintain this state. However, during prolonged heating periods, actuators may display a terminal electrical resistance 116 somewhat higher than its "minimum" value. This increase in terminal resistance 116 is also sometimes the case in aged actuators that have experienced many cycles of phase transformation and re-elongation.

When the on-vehicle device is in its "off-mode" or its inactive mode, the linear SMA actuator 14 is in its martensitic metallurgical phase and has been stretched to its intended length such that its connected, movable component (lever 20 in FIG. 1) is in its inactive or stored position. And the actuator 14 is at the ambient temperature of its device location on the vehicle. Upon a signal by computer system 30, a specified initial actuation signal (DC or pulse-width modulation) is applied between the ends 16, 18 of actuator 14 for the purpose of passing an electrical current through the metal composition of the linear SMA actuator to heat the actuator to its austenite phase. The amount of current is specified so as to quickly heat the actuator 14 within a suitable period of time to a temperature of several Celsius degrees (for example, twenty or thirty degrees Celsius) above its ambient temperature and martensitic crystal structure. The time period required to heat an actuator through the start of its phase transition depends on factors including current level, wire diameter, and ambient temperature. Such time periods may vary between a few milliseconds up to a few minutes depending on these parameters. The required temperature increase will depend on the specific composition of the Ni—Ti or other SMA material. For purposes of example only, an initial potential of twelve volts and current of two amperes may be applied. As stated, the linear actuator is rapidly heated and transforms into its austenitic phase. As it transforms, the linear actuator 14 shortens and moves its lever arm 20 (or other movable component to its active position. The force applied by the thermally transforming actuator 14 (into its austenite phase) is strong enough to overcome the return-direction force of spring 22. After the actuator has transformed to austenite, heating is continued to maintain it in its shortened length as long as the movable component of the device is to be maintained in its activated position. The applied voltage and current are typically reduced (with one being controlled, the other adjusting accordingly to satisfy the electric current), but maintained at levels sufficient to retain the actuator 14 in its shortened-length, austenitic phase until the device is to be shut off, and its movable component (e.g., lever arm 20) returned by its spring 22 to its inactive position. As the electrical current is being passed through actuator 14, its resistance changes with time. FIG. 2 is a graph illustrating an example of the pattern of resistance change in an actuator of shape memory Ni—Ti composition.

In the example of FIG. 2, resistance values are presented with the vertical axis 100 reflecting measured relative values of electrical resistance of an actuator as it is heated and transformed to austenite. The horizontal axis 102 displays relative time. There is a break in the time axis 102 to reflect a likely prolonged holding period in which the actuator 14 experiences the direct current and is maintained in its austenitic phase condition.

As illustrated in FIG. 2, as heating is commenced the martensitic actuator has an initial moderate resistance value indicated at 110. This value may vary somewhat depending on the initial ambient temperature of the device and actuator 14 as well as the line resistance and contact resistance. As the current flow heats the actuator, its electrical resistance increases steadily to a maximum value (indicated at 112). The electrical resistance increases as the temperature of the actuator composition increases in the martensite phase. The maximum resistance value is a reflection of the stress and strain experienced by the actuator as it starts to transform to its austenite phase, shortens, and starts to move its movable component in its device. The controlled voltage or current is decreased to levels suitable to maintain the actuator in its austenitic phase and to hold open its movable component against the return-force of spring 22. The resistance of actuator 14 decreases during the phase transition period to a substantially minimal value 114. This decrease occurs because the intrinsic resistivity of the austenite phase is less than that of the martensite phase in the range of temperatures typically observed for actuation in NiTi alloys. For other alloys a rise in the resistance or other pattern may be observed depending on the resistance of each constituent phase. The analysis of electrical resistance is based similarly and will work similarly but the expected changes may differ depending on the alloy. The electrical resistance values are seen to increase slightly from a minimal value 114 to a higher terminal value 116 during this continued controlled hold. At some point in device operation, an operator command, or a computer system signal stops the flow of current. The actuator is cooled in its environment, transforming into its martensite phase, and it is deformed by spring 24 loading to (or toward) its intended length for the inactive state of the movable component and the device.

As this operation of the device is repeated, again and again, during cycles of operation of the on-vehicle device, the computer system 30 also detects and evaluates current flow-time and electrical resistance-time patterns of the linear SMA actuator (such as actuator 14) and compares such data with historical data or preprogrammed data to monitor the function of the much of the device. Examples of such monitoring by computer system 30 are as follows.

Following are examples of improper device operation that may be detected through instrumental and computer-based observation of changes in the time function of the electrical current and electrical resistance (e.g., FIG. 2 type data) of the SMA actuator element of the device. Some aspects of the testing may be conducted without full actuation of the linear SMA actuator. In most instances it may be preferred to conduct the monitoring of the device during a routine actuation of the actuator element. In preferred embodiments of the monitoring processes of this invention, initial current flow for device testing or for activation of the linear SMA actuator is first considered.

When current flow is to be initiated, attention is immediately given to the detected value of current flow. When there is no detected current flowing through the linear SMA actuator, it is determined that there is an open circuit due either to a broken wiring harness (e.g., leads 28 in FIG. 1), an electrical fuse, or to a broken SMA actuator wire, or to a disconnected end electrical attachment. And very high current flow may indicate a short circuit involving the wiring harness or the SMA wire. The appropriate conclusion may be reported by computer system 30 and notice given audibly, or on instrument panel screen 40, or by other attention-providing means. Such notices throughout the full monitoring of the device may include statements of what to check first regarding the operation of the device. And as stated above, information from computer system 30, or the like, may be transmitted outside of the vehicle for analysis at a remote location with diagnostic information being returned to the vehicle or to a service provider.

Next the pattern of the current flow with time may be considered by the monitoring computer system. By specification or by operating experience, a pattern of the resistance heating current flow through the SMA actuator will have been placed in the memory of the computer system. For example, it may be found that the current flow decreases by about 15% during a few second initial heating of the linear SMA actuator.

If the observed current flow during device monitoring is found to be within an expected range and pattern, attention may be given to other monitoring steps. But if the variation in current flow is outside of a normal range, it may be concluded that there are unintended contacts (such as "grounding") of the SMA wire with other components of the device or loose contacts with other components. Notice is given of this diagnostic conclusion.

Monitoring steps may now turn to consideration of the electrical resistance of the linear SMA actuator as it is being heated prior to transformation to austenite. During such monitoring comparisons of the initial resistance, the time and value of peak resistance (as illustrated in FIG. 2) are considered. During such monitoring comparisons after the peak resistance is reached and the SMA experiences a phase transition from austenite to martensite, the time and value of the minimal resistance (as illustrated in FIG. 2) are considered. Of course when the pattern of the electrical resistance of the actuator with time follows the expected pattern, there is no evidence of a problem in the device. But where there is a significant departure from the specified or historical resistance/time pattern, useful monitoring information may be taken from the unusual pattern that is now being observed by the computer system.

For example, when the value of the resistance of the linear actuator does not increase to a suitable value while the vehicle is moving (but does reach the expected value when the vehicle is not moving), notice may be given that the linear actuator is experiencing excessive cooling due to exposure of the actuator within the otherwise protective cover of the device. The covering of the actuator may have been lost and air flow around the moving vehicle causes excessive heat loss and prevents phase transition.

A maintained high electrical resistance value may be interpreted to indicate blocking of the movable component of the device. For example, in the case in which the SMA actuated device is an HVAC baffle or vent, the high resistance value suggests likely blockage of the movable component of the HVAC. Notice may be provided from the computer diagnostic system to the operator of the vehicle. An increase in resistance may indicate an unwanted increase in stress on the SMA actuator. For example, it may indicate a change the spring constant of the return spring or an unwanted interaction between the actuator and spring or spring stop.

Further evidence of blocked contraction of the SMA actuator is indicated by the absence of the expected amount of a reduction in the electrical resistance after it reaches its maximum value. Again, this pattern in the resistance vs. time curve suggests blockage of the movable component (such as ice formation on a HVAC louver). The current to the actuator should be stopped and notice given to the vehicle operator.

If an abnormally low value of peak resistance coupled with a higher value of minimum resistance should be observed during monitoring it indicates a low stress level in the SMA actuator. This is often attributable to broken or loose end points of the SMA actuator, or broken resetting springs, or a loose/moved end point of the SMA actuator on the other side of the reset spring.

The continued cycling of the device depends on a reset spring returning the cooled SMA actuator (now in its martensitic phase) to its original length. If the return of the SMA actuator does not occur, this problem often results from a blocked reset spring or a loose/moved end point of the reset spring. This problem may be detected by a lower than expected initial value 110 (FIG. 2) in the electrical resistance of the SMA actuator. This diagnosis may be conducted when an actuator has completed its task and cooled to is ambient temperature in its device. Then, when a shortened SMA actuator experiences the application of a current to reactivate it, it is then found that its initial value (110 in FIG. 2) is lower than expected with respect to the condition and environment of the device. For example, when this initial electrical resistance value 110 is found to be reduced to a resistance value at least 5% below its normal value at the operating condition of the device, it is determined that the SMA actuator has not been stained fully to its original length.

Sometimes a linear SMA actuator becomes stretched slightly beyond its intended length in its cooled martensitic state. It displays slack which must be taken up before further shrinkage can move the movable component. The slack must be removed for proper actuation of the movable member of the device. Such a condition of slack is diagnosed, in a FIG. 2-type resistance-time data, when the reduction in SMA resistance following a peak value is followed by a plateau and a further reduction in value.

From the several illustrative examples presented in the preceding paragraphs it is apparent the current values and electrical resistance values experienced by a linear SMA actuator may be evaluated and used to diagnose problems in the operation of the device in which it is employed. The diagnostic information may be presented to the operator of a vehicle, or another person, and used to repair and maintain the device.

Practices of the invention have been illustrated by the presentation of several specific examples. But these examples are not intended to be limiting of the scope of the invention.

The invention claimed is:

1. A method of monitoring the operation of an on-vehicle device with a movable component capable of adopting at least two positions, the device being operated by direct current (DC) electricity provided by a vehicle battery, the device comprising:
    the movable component that is moved with respect to other components of the device by a linear shape memory alloy (SMA) actuator as a part of the device, the SMA actuator being in electrical communication with the vehicle battery for heating the SMA actuator, the heating of the actuator being selected to cause the SMA actuator to transform from a first metallurgical phase to a second metallurgical phase and to thereby shorten in length to move the moveable component from an initial position to a second position, the device further comprising a return spring arranged and adapted to stretch the SMA actuator when heating is discontinued and the SMA actuator cools and transforms from the second metallurgical phase to the first metallurgical phase, the extent of the stretching being limited by a stop, the stop being positioned so that the moveable component is moved from the second position and restored to the initial position to prepare the SMA actuator for repeated operation, the method of monitoring the on-vehicle device comprising:
    repeatedly operating the device in response to an actuating signal by applying, for at least a predetermined heating time, a predetermined direct current electrical potential across the full length of the linear SMA actuator to produce an electrical current through the length of the linear SMA actuator, the predetermined DC electrical potential and predetermined time period being selected to heat the linear actuator to a temperature sufficient to transform the linear SMA actuator to the second metallurgical phase in which the length of the linear actuator is shortened so as to reposition the movable component, and making, at time intervals during application of DC current to the SMA actuator, a series of simultaneous measurements of the instantaneous electrical potential and instantaneous electrical current, and using these measurements to compute a series of measures of the electrical resistance of the linear SMA actuator at like time intervals; then,
    stopping DC current flow and allowing the linear SMA actuator to cool to a temperature sufficient for the SMA actuator to transform to the first metallurgical phase in which the return spring strains the linear SMA actuator to its original length and returns the movable component to its original position to ready the device for subsequent operation;
    placing and retaining pre-specified data, or historical data, of acceptable heating current flow in the linear SMA actuator and variation in electrical resistance during the heating time of the linear SMA actuator in an on-vehicle computer system; and
    thereafter, during each use of the on-vehicle device, using the on-vehicle computer system, to compare values of current flow and electrical resistance experienced by the linear SMA actuator during application of DC electricity to monitor the present function and viability of the device, and to report a malfunction in the device to a vehicle operator or a device service location, where such comparing comprises the consideration of at least one of an initial current value and a sequence of current values over a time period, and also a sequence of electrical resistance values over a time period.

2. A method of monitoring the operation of a device as recited in claim 1 in which no current flow through the linear SMA actuator is detected upon activation of the device, and providing one or more of visual, audible or electronic notice to the vehicle operator of an open electrical circuit in the device, the notice giving priority to checking for one of a broken SMA actuator and a broken wiring harness connected to the actuator.

3. A method of monitoring the operation of a device as recited in claim 1 in which an increase in current value is detected that exceeds a specified increase in current value, with the conclusion that an electrical short circuit exists in the device and providing one or more of visual, audible or electronic notice(s) of such electrical short circuit to the vehicle operator.

4. A method of monitoring the operation of a device as recited in claim 1 in which an increase in current value over time is detected, which increase in current value over time exceeds a predetermined value, with the conclusion that circuitry in the device is electrically grounded or compromised by loose electrical contacts and providing one or more of visual, audible or electronic notice(s) of such grounding or loose electrical contacts to the vehicle operator.

5. A method of monitoring the operation of a device as recited in claim 1 in which a measured high initial peak value of electrical resistance is detected and compared with like values with the conclusion that unwanted blockage of the movable component in the device has occurred and providing one or more of visual, audible or electronic notice(s) of such unwanted blockage to the vehicle operator.

6. A method of monitoring the operation of a device as recited in claim 1 in which a measured low value of electrical resistance is detected and compared with like values with the conclusion that the linear SMA actuator is not connected per device design to the movable component within the device and providing one or more of visual, audible or electronic notice(s) of such non-connection to the vehicle operator.

7. A method of monitoring the operation of a device as recited in claim 1 in which measured resistance values over a predetermined heating period do not reduce from a peak value, with the conclusion that a blockage within the device has prevented the design specified shortening of the linear SMA actuator and providing one or more of visual, audible or electronic notice(s) of such blockage within the device to the vehicle operator.

8. A method of monitoring the operation of a device as recited in claim 1 in which increased electrical resistance heating times of a specified increased value are detected when the vehicle is in motion with the conclusion that the linear SMA actuator is being exposed to flow of cooling air that is a result of a change in the structure of the device and providing one or more of visual, audible or electronic notice(s) of such cooling airflow to the vehicle operator.

9. A method of monitoring the operation of a device as recited in claim 1 in which increased heating times of the SMA actuator are detected without a corresponding increase in the electrical resistance of the SMA actuator with the conclusion that the SMA is pulling less than its specified load indicating that the return spring member for the SMA actuator is not providing its specified return force and providing one or more of visual, audible or electronic notice(s) of such non-specified spring biasing force to the vehicle operator.

10. A method of monitoring the operation of a device as recited in claim 1 in which a low initial peak resistance value is interpreted as indicating defects in the device associated with attachments to the SMA actuator and providing one or more of visual, audible or electronic notice(s) of such device defects to the vehicle operator.

11. A method of monitoring the operation of a device as recited in claim 1 in which incomplete straining of the SMA actuator to its original position length, following removal of its actuating current and cooling of the actuator to ambient temperature, is identified by an initial electrical resistance value that is lower than a specified initial electrical resistance value for the SMA actuator and providing one or more of visual, audible or electronic notice of such incomplete straining to the vehicle operator.

12. A method of monitoring the operation of a device as recited in claim 1 in which a pattern of electrical resistance over heating time is detected in which variations in electrical resistance increase following a minimum value indicating that the linear SMA actuator has experienced an increase in its length that adversely affects the positioning of the movable component and providing one or more of visual, audible or electronic notice of such increase in length to the vehicle operator.

13. A method of monitoring the operation of a device with a movable component capable of adopting at least two positions, the device being positioned on an automotive vehicle comprising a battery:

the device comprising the movable component that is moved with respect to other components of the device by a linear shape memory alloy (SMA) actuator, the SMA actuator being actuated by a direct current (DC) electrical potential supplied by the vehicle battery and applied across the full length of the linear actuator in response to an actuating signal issued during vehicle operation, the applied DC electrical potential producing a direct electrical current along the length of the linear SMA actuator to heat the linear actuator and transform it from a first metallurgical phase to a second metallurgical phase in which the length of the linear actuator is shortened so as to reposition the movable component from an initial position;

the device further comprising a return spring and a stop adapted and arranged to stretch the linear actuator and restore the moveable component to the initial position when heating of the linear actuator is discontinued and the SMA actuator cools and transforms to the first metallurgical phase, the method of monitoring the operation of the device comprising:

actuating the on-vehicle device, and, as the SMA actuator is heated and shortened during application of the DC current, making, at time intervals, a series of simultaneous measurements of the instantaneous electrical potential and instantaneous electrical current and using these measurements to compute a series of measures of the resistance of the linear SMA actuator at like time intervals and storing the electrical potential, electrical current and electrical resistance measurements;

comparing at least one of an electrical current value at a selected time and a sequence of electrical current values over a time period, and at least one of a value of electrical resistance at a selected time and a sequence of electrical resistance values over a time period experienced by the linear SMA actuator during passage of DC electricity in the instant actuation of the SMA actuator with like, stored measures of one or more of initially specified values, initially specified ranges and historical values of electrical current and electrical resistance using an on-vehicle computer system, for the purpose of monitoring the present function and viability of the device, the on-vehicle computer system further reporting any malfunction in the device to a vehicle operator.

14. A method of monitoring the operation of a device on an automotive vehicle as recited in claim 13 in which no current flow through the linear SMA actuator is detected upon activation of the device, and providing one or more of visual, audible or electronic notice(s) to the vehicle operator of an open electrical circuit in the device, the notice giving priority to checking for one of a broken SMA actuator and a broken wiring harness connected to the actuator.

15. A method of monitoring the operation of a device on an automotive vehicle as recited in claim 13 in which an increase in current value is detected that exceeds a specified increase in current value, with the conclusion that an electrical short circuit exists in the device and providing one or more of visual, audible or electronic notice(s) of such electrical short circuit to the vehicle operator.

16. A method of monitoring the operation of an on-vehicle device as recited in claim 13 in which an increase in current value over time is detected, which increase in current value over time exceeds a predetermined value, with the conclusion that circuitry in the device is electrically grounded or compromised by loose electrical contacts and providing one or more of visual, audible or electronic notice(s) of such grounding or loose electrical contacts to the vehicle operator.

17. A method of monitoring the operation of a device on an automotive vehicle as recited in claim 13 in which a measured high initial peak value of electrical resistance is detected and compared with like values with the conclusion that unwanted blockage of the movable component in the device has occurred and providing one or more of visual, audible or electronic notice(s) of such unwanted blockage to the vehicle operator.

18. A method of monitoring the operation of a device on an automotive vehicle as recited in claim 13 in which a measured low value of electrical resistance is detected and compared with like values with the conclusion that the linear SMA actuator is not connected per device design to the movable component within the device and providing one or more of visual, audible or electronic notice(s) of such non-connection to the vehicle operator.

19. A method of monitoring the operation of a device on an automotive vehicle as recited in claim 13 in which measured resistance values over an electrical resistance heating period do not reduce from a peak value, with the conclusion that a blockage within the device has prevented the design specified shortening of the linear SMA actuator and providing one or more of visual, audible or electronic notice(s) of such blockage within the device the vehicle operator.

20. A method of monitoring the operation of a device on an automotive vehicle as recited in claim 13 in which increased electrical resistance heating times of a specified increased value are detected when the vehicle is in motion with the conclusion that the linear SMA actuator is being exposed to flow of cooling air that is a result of a change in the structure of the device and providing one or more of visual, audible or electronic notice(s) of such cooling airflow to the vehicle operator.

21. A method of monitoring the operation of an on-vehicle device as recited in claim 13 in which increased heating times of the SMA actuator are detected without a corresponding increase in the electrical resistance of the SMA actuator with the conclusion that the SMA is pulling less than its specified load indicating that the return spring member for the SMA actuator is not providing its specified return force and providing one or more of visual, audible or electronic notice(s) of such non-specified spring biasing force to the vehicle operator.

22. A method of monitoring the operation of a device on an automotive vehicle as recited in claim 13 in which a low initial peak resistance value is interpreted as indicating defects in the device associated with attachments to the SMA actuator and providing one or more of visual, audible or electronic notice of such device defects to the vehicle operator.

23. A method of monitoring the operation of an on-vehicle device as recited in claim 13 in which incomplete straining of the SMA actuator to its original position length, following removal of its actuating current and cooling of the actuator to ambient temperature, is identified by an initial electrical resistance value that is lower than a specified initial electrical resistance value for the SMA actuator and providing one or more of visual, audible or electronic notice(s) of such incomplete straining is provided to the vehicle operator.

24. A method of monitoring the operation of an on-vehicle device as recited in claim 13 in which a pattern of electrical resistance over heating time is detected in which variations in electrical resistance increase following a minimum value indicating that the linear SMA actuator has experienced an increase in its length that adversely affects the positioning of the movable component and providing one or more of visual, audible or electronic notice of such increase in length to the vehicle operator.

* * * * *